TEMPERATURE COMPENSATED SLOW WAVE STRUCTURE

Filed July 16, 1962

INVENTORS
HUNTER L. MC DOWELL
JOSEPH E. SIDOTI

BY [signature]
ATTORNEY 3,185,890

TEMPERATURE COMPENSATED SLOW WAVE STRUCTURE

Hunter L. McDowell, Chatham Township, Morris County, and Joseph E. Sidoti, Middletown, N.J., assignors to S-F-D Laboratories, Inc., Union, N.J., a corporation of New Jersey Filed July 16, 1962, Ser. No. 209,911
3 Claims. (Cl. 315—39.69)

Figure 1:
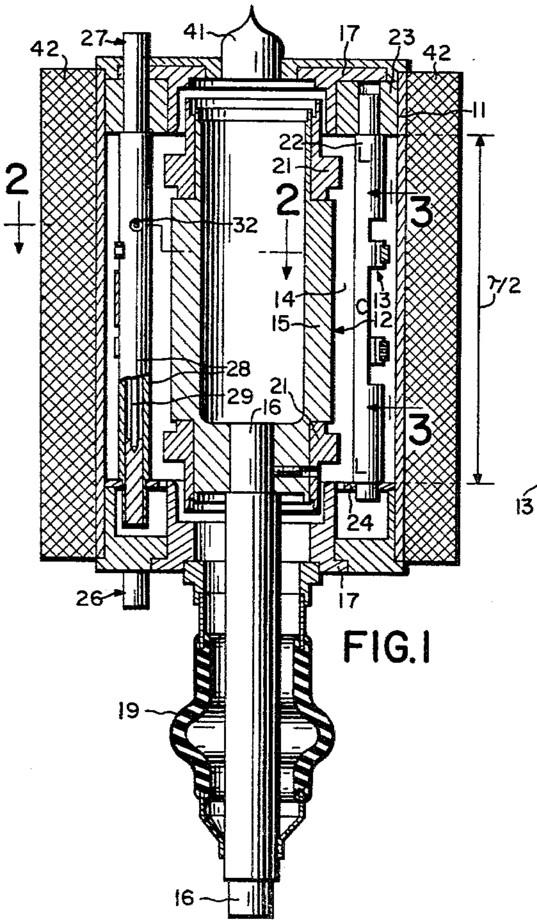

The present invention relates in general to microwave devices of the type wherein a traveling electromagnetic wave of phase velocity less than the velocity of light interacts with a stream of particles (for example, electrons) and, more particularly, to novel techniques for providing temperature compensation to slow wave circuits having increased interaction bandwidth and comprising an array of conducting resonant elements alternately capacitively coupled.

Electron tubes are presently being built utilizing slow wave structures made up of an array of resonant elements wherein the term "resonant element" refers to either a conductor which extends for a distance $$\frac{\lambda}{4}+\frac{n\lambda}{2}$$

($\lambda$=wavelength at a reference opertaing frequency, $n$=0, 1, 2, etc.) from a single short circuiting plane, or to a conductor which extends for a distance $$\left(n+1\times\frac{\lambda}{2}\right)$$

between two spaced apart short circuiting planes. Slow wave circuits employing an array of such elements are characterized by high interaction impedance and high power handling capabilities. The bandwidth of such circuits has been improved by providing a resonant element array slow wave structure adapted to propagate a forward wave with a phase shift of between $\pi/2$ and $\pi$ radians per element. This has been accomplished by providing means for preferentially capacitively coupling alternate resonant elements in the capacitive regions thereof. In a typical structure, conducting members are connected to each element of the resonant array in the central capacitive region thereof and extend in spaced apart capacitive relation with respect to members extending from the two alternate elements closest thereto. A slow wave circuit of this ytpe forms the subject matter of and is claimed in U.S. application 164,008, titled "Slow Wave Circuit," inventor Hunter L. McDowell filed January 3, 1962 and assigned to the same assignee as the present invention.

However, in slow wave structures provided with alternate capacitively coupled resonant elements difficulty has arisen in providing a sufficiently stable circuit over a wide temperature range. In typical prior art structures the capacitive coupling between alternate resonant elements are adversely effected when the tube heats up or changes temperature. The resonant elements expand and contract different amounts thereby changing the size of the capacitive gap between the alternate elements. More specifically, a difference in expansion exists around the tube from input to output because the current collected per bar gradually increases in this direction.

According to the present invention, interleaved portions are provided between the conducting members coupling alternate conducting elements of the slow wave structure whereby the capacitance between the coupling members remains substantially constant over wide temperature ranges and for relative movement between the coupling members on alternate conducting elements of the slow wave structure.

The object of the present invention is to provide a temperature stable slow wave structure having a wide interaction bandwidth.

One feature of the present invention is the provision of a slow wave structure having an array of conducting elements, conducting members providing capacitive gaps between alternate conducting elements, and interleaved portions on the conducting members for maintaining the capacitance of the capacitive coupling gaps constant over a wide temperature range.

Another feature of the present invention is the provision of a novel slow wave structure of the last aforementioned feature wherein the conducting elements are notched on their sides away from the interaction region and the inner end said interleaved portions of the conducing members coupling alternate conducting elements are positioned over the notched portion of the conducting element therebetween whereby the slow wave structure is easily assembled, compact and easily inserted into an electron tube.

Another feature of the present invention is the provision of a slow wave structure according to the first aforementioned feature wherein each of said interleaved portions includes a forked portion on one extending portion and a prong portion on the adjacent extending portion, said prong portion positioned between the forks of said forked or bifurcated portion whereby during movements of said prong portion relative to said forked portion the capacitance of the coupling gap therebetween remains substantially constant.

Figure 3:
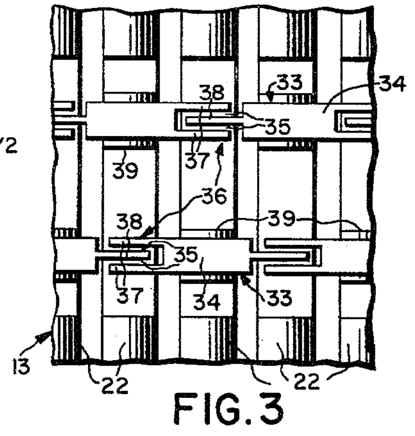
Figure 2:
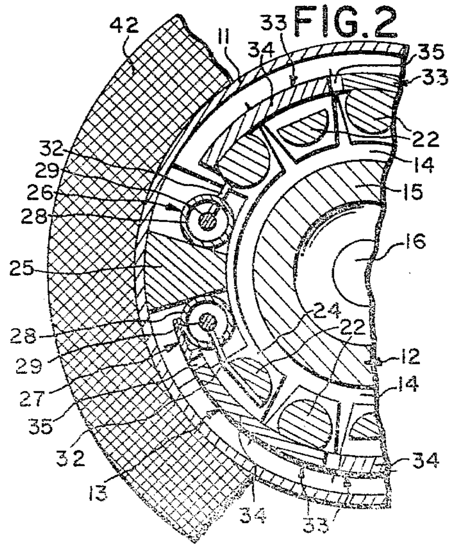
Figure 4:
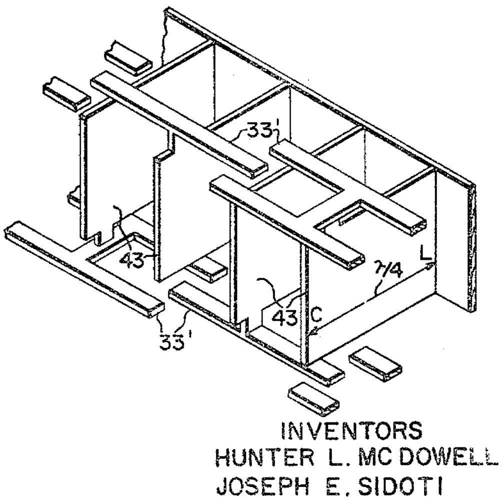

These and other features and advantages of the present invention will become more apparent upon a perusal of the following specification taken in connection with the accompanying drawings wherein:

FIG. 1 is a side cross sectional view of a crossed-field amplifier utilizing the features of the present invention, FIG. 2 is a cross sectional view of a portion of the structure of FIG. 1 taken along line 2—2 in the direction of the arrows, FIG. 3 is a side view of a portion of the structure of FIG. 1 taken along line 3—3 in the direction of the arrows, and FIG. 4 is an isometric view of a quarter-wave vane slow wave circuit provided with a capacitive coupling structure in accordance with the present invention.

Referring to FIGS. 1 and 2 illustrating a crossed field amplifier tube utilizing the present invention, the tube comprises an evacuated envelope 11 provided with a cathode electrode assembly 12 axially located therein and an anode electrode assembly 13 surrounding and spaced from the cathode assembly 12 to define a wave-electron stream interaction region 14 therebetween.

The cathode electrode assembly 12 includes a continuous cylindrical cold cathode 15 made of a material having a high secondary emission ratio such as beryllium-copper, which is supported coaxially within the tube by means of a shaft 16 of, for example, copper extending through the lower of a pair of annular header members 17 which are made of a magnetic material as, for example, iron to serve as pole pieces. The shaft 16 serves as the cathode connection for the tube and is electrically insulated from the remainder of the tube by means of an annular insulator 19 of, for example, glass. The cathode is provided with a pair of end hats 21 of, for example, iron which confine the emitted electrons to the interaction region 14 between the cathode assembly 12 and the anode assembly 13.

The anode assembly 13 includes an array of half-wave resonant conducting rods or elements 22 of, for example, copper which are distributed along spaced apart top and bottom shorting members 23 and 24, respectively, of, for example, copper to form a slow wave structure. The slow wave structure is interrupted to provide a drift segment 25. The axial standing wave pattern established on such resonant elements exhibits characteristic regions of high electric field intensity, referred to herein as capacitive regions, and characteristic regions of high magnetic field intensity, referred to herein as inductive regions. In the structure of FIGS. 1–3 a capacitive region C exists near the center of the conducting rods 22 and an inductive region L exists near the shorted ends of each rod (see FIG. 1).

On opposite sides of the drift segment 25 input and output coaxial lines 26 and 27, respectively, are mounted on shorting members 23 and 24 with the axes of the coaxial lines 26 and 27 parallel to the axes of conducting rods 22 of the anode assembly 13. The coaxial lines 26 and 27 project out of opposite ends of the envelope 11 and have their axes parallel with the tube axis. Each of the coaxial lines 26 and 27 has an outer conductor 28 of, for example, copper and a center conductor 29 of, for example, copper and is provided with a vacuum tight wave permeable window (not shown) of, for example, alumina ceramic sealed between the outer and center conductors 28 and 29, respectively. A conducting pin 32 of, for example, copper connects the closest conducting rod 22 to the center conductor 29 of input and output coaxial lines 26 and 27 to couple the coaxial lines 26 and 27 to the remainder of the slow wave circuit. These coaxial line input and output circuits form the subject matter of copending U.S. application 214,115 titled "Crossed Field Tube Coupling Apparatus," inventor Andrew S. Wilczek et al., filed August 1, 1962 and assigned to the same assignee as the present invention. The outer conductors 28 of the input and output coaxial lines 26 and 27 serve as the first and last conducting elements, respectively, of the slow wave structure.

In order to increase the interaction bandwidth of the slow wave structure and insure forward wave interaction each conducting rod 22 is provided in the central capacitive region thereof with a conducting member 33 (see FIGS. 2 and 3) with extending portions 34 disposed in spaced-apart relationship with respect to the extending portions 34 of conducting members 33 on the two closest alternate conducting rods to form capacitive coupling gaps 35 therebetween. One band of conducting members or straps 33 couples or electrically straps one set of alternate conducting rods 22, and a second band or straps couples or electrically straps the remaining rods 22.

The ends of the adjacent extending portions 34 defining each capacitive gap 35 are provided with interleaved portions 36 such as a forked portion 37 on one extending portion 34 and a prong portion 38 on the other extending portion 34 positioned between the forks of the forked or bifurcated portion 37 of the first extending portion 34.

By this construction a temperature compensated broadband circuit is provided. During longitudinal movement of the conducting rods 22 caused, for example, when the tube heats up or by a gradual increase of intercepted current along the circuit the total capacitance between the interleaved portions 36 will remain substantially constant regardless of relative movement between forked portions 37 and prong portions 38. The increase in capacitance caused by the prong portion 38 approaching one half of the forked portion 37 will be offset by the decrease in capacitance between the prong portion 38 and the other half of the forked portion 37. Since the capacitance at the gap 35 is determined primarily by the sides of the forked and prong portions 37 and 38, respectively, longitudinal movement of the extending portions 34 will have substantially no effect on the total capacitance.

This construction also has an advantage from the parts tolerance standpoint since if the prong portion 38 of one rod 22 is slightly displaced with respect to the forked portion 37 of one of the alternate rods 22 during assembly of the anode structure the error in the capacitance will be compensated for to a first order.

In the central portion of their length the conducting rods 22 are reduced to a semicircular cross section by, for example, milling away the half of each conducting rod 22 facing away from the interaction region except for a short mounting portion 39 on which the conducting members are mounted. The interleaved portions 36 in each band of conducting rods 22 will lie over the removed portions of the conducting rods 22. By this construction the anode electrode assembly 13 with the conducting members 33 attached thereto will take up a minimum of space and can easily be slideably inserted into the envelope 11 during assembly of the tube.

This reduced semicircular cross section also provides tubes with higher power handling capabilities. Greater power can be produced with longer conducting rods 22. Rods longer than $\lambda/2$ are first selected, and the resonant frequency of hte rods is raised by cutting away the central portion thereof in the manner described above.

The tube is evacuated and sealed by means of a pinch-off tube 41.

A vertically directed magnetic field is provided in the interaction region 14 by means of a solenoid 42 axially aligned with and surrounding the tube. The crossed electric field in the region 14 is provided by means of a negative voltage applied between the grounded anode assembly and the cathode shaft 16.

In operation, a signal which it is desired to amplify is fed to the slow wave circuit of the anode electrode assembly 13 via the input coaxial line 26. This signal establishes a traveling wave in the interaction region 14 of sufficient intensity to initiate the emission of electrons from the cold cathode 15, and this emission can be sustained by secondary emission due to back bombarding electrons which have gained energy from the wave without the necessity of supplying external heating power. The interacting electron stream moves through the region 14 with a clockwise circumferential velocity determined by the ratio of electric-to-magnetic field. The phase velocity of the traveling wave is approximately synchronous with this electron stream velocity for a wide band of frequency so that the electrons deliver energy to and amplify waves within this band, the amplified output signal being taken out through the output coaxial line 27. The drift segment 25 is of sufficient length to permit electron debunching so that electrons may re-enter the interaction region for improved efficiency without producing undesired internal feedback.

The present invention is applicable to circuits other than the type described above such as, for example, the resonant vane type circuits shown in FIG. 4. For example, resonant vane element circuits of the type shown in FIG. 4 have a capacitive region C near the extremity of each conducting vane element 43 and an inductive region L near the base of each vane. As shown, conducting members 33′ (FIG. 4) can project from the quarter wavelength vanes 43 and be horizontally interleaved.

All of the slow wave circuits described above are useful in electron traveling wave tubes in which an electron stream is passed adjacent the capacitive region thereof. With regard to structures of the planar type instead of the cylindrical type described with reference to FIGS. 1–3, in the case of so-called M-type tubes, crossed unidirectional electric and magnetic fields are established in mutually perpendicular relationship with reference to the direction of the electron stream, and in the case of O-type tubes these fields are established collinearly with the stream. It may be noted that in the case of O-type tubes electrons may conveniently be directed down a passageway cut directly through the resonant elements rather than exterior to the elements as is the usual situation in M-type tubes.

A circular crossed-field amplifier tube constructed according to the present invention for a frequency range of from 1150 to 1300 megacycles and which produces a peak output power on the order of 100 kilowatts with a gain of 20 db is less than 10 inches long and 4 inches in diameter.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave amplifier tube including, means for producing a stream of electrons, an array of resonant conductive elements having separate predominately capacitive and inductive regions thereof disposed adjacent said stream of electrons to form a forward wave slow wave circuit for electromagnetic interaction between electrons of said stream and wave energy traveling on said array of resonant conductive elements, means for coupling amplified signal wave energy from the tube apparatus for propagation to a suitable load, means forming a pair of conductive straps conductively connected to said array of conductive elements predominately in the capacitive regions thereof, one of said straps being conductively connected to every other one of said resonant conductive elements of said array and the other one of said straps being conductively connected to the ones of said conductive elements of said array which are not connected to said first strap means and which are disposed inbetween said resonant elements connected to said first strap means, and at least said first straps means including a plurality of capacitor means series connected in said strap with a capacitor means series connected in said first strap means between successive ones of said connections of said strap means to every other one of said resonant elements, and said series capacitor means including a bifurcated portion of said strap forming one part of said capacitor means with a second portion of said capacitor means formed by another portion of said first strap and disposed inbetween and spaced from the bifurcated portion of said strap whereby the capacitance of said capacitor means is rendered substantially non-responsive to relative movement between connected portions of said strap occasioned by temperature variations of said slow wave circuit.

2. The apparatus according to claim 1 wherein the other one of said pair of straps includes capacitor means series connected in said second strap in the same manner as in said first strap means.

3. The apparatus according to claim 2 wherein said array of resonant elements includes an array of resonant bars with said strap means connected to said bars intermediate their lengths.

References Cited by the Examiner

UNITED STATES PATENTS

| | | | |
|---|---|---|---|
| 2,481,171 | 9/49 | Spencer | 315—39.51 X |
| 2,550,614 | 4/51 | Spencer | 315—36.69 X |

FOREIGN PATENTS

| | | |
|---|---|---|
| 806,551 | 12/58 | Great Britain. |
| 863,992 | 3/61 | Great Britain. |

ROBERT SEGAL, *Acting Primary Examiner.*